United States Patent Office 3,796,753
Patented Mar. 12, 1974

3,796,753
PROCESS FOR THE JOINT MANUFACTURE OF ALIPHATIC ALDEHYDES AND CARBOXYLIC ANHYDRIDES
Wilhelm Vogt, Hurth-Efferen, Hermann Glaser, Erftstadt-Lechenich, and Helmut Dyrschke, Erftstadt-Kottingen, Germany, assignors to Knapsack Aktiengesellschaft, Knapsack, near Cologne, Germany
No Drawing. Filed Aug. 10, 1972, Ser. No. 279,431
Claims priority, application Germany, Aug. 12, 1971, P 21 40 409.1
Int. Cl. C07c 51/56
U.S. Cl. 260—549                10 Claims

ABSTRACT OF THE DISCLOSURE

Aliphatic aldehydes and carboxylic anhydrides are jointly produced by subjecting aliphatic carboxylic acid alkenyl esters to acylolysis at elevated temperature and, if desired, under pressure in contact with a catalyst and by subjecting the resulting reaction mixture to distillation so as to separate resulting aldehyde and resulting carboxylic anhydride therefrom. To this end, a vapor mixture of an aliphatic carboxylic acid alkenyl ester with at most 7 carbon atoms, an aliphatic carboxylic acid with at most 4 carbon atoms and, if desired, an inert gas is passed, at elevated temperatures substantially between 250 and 500° C. and under pressure, if desired, over an acid catalyst. The catalyst comprises silicic acid or an acid aluminosilicate or an inert carrier including, for example aluminum oxide, pumice or active carbon which is impregnated with phosphoric acid or one or more heteropolyacids.

---

The present invention relates to the joint manufacture of aliphatic aldehydes and carboxylic anhydrides by subjecting carboxylic acid alkenyl esters to acylolysis in contact with acid catalysts.

Carboxylic acid alkenyl esters, for example vinyl acetate or allyl acetate, are commercially readily available products, which are made by reacting unsaturated aliphatic hydrocarbons, such as ethylene or propylene, with carboxylic acids. These reactions are catalyzed by the presence of metals or salts of elements belonging to Group VIII of the Periodic Table, which are used together with certain activators. The starting materials, which are obtainable from petrochemical substances, enable the production of carboxylic acid alkenyl esters under highly economic conditions. As a result, the transformation of these esters into useful secondary products has gained commercial interest. By subjecting vinyl acetate to hydrolysis with water in the presence of acid catalysts, it is possible, for example, to produce acetaldehyde and acetic acid, and by subjecting allyl acetate to hydrolysis with water, it is possibile to produce acetic acid and, this conditional upon the reaction conditions selected, allyl alcohol or propionaldehyde.

It has also been reported that the water may be replaced by acetic acid and that anhydrous vinyl acetate can be reacted therewith in contact with a catalyst. This results in the formation of different reaction products, conditional upon the nature of the catalyst used. As disclosed in German Pat. 313,696, ethylidene diacetate is obtained by the reaction of vinyl acetate with acetic acid in the presence of minor proportions of concentrated sulfuric acid, at boiling temperature and at atmospheric or elevated pressure. On the other hand, if use is made of the process described in British specification 1,100,901, wherein vinyl acetate is reacted with acetic acid in liquid phase in the presence of $PdCl_2$ and $CuCl_2$, it is possible to produce acetic anhydride and acetaldehyde by subjecting vinyl acetate to acylolysis. This reaction, which has also been described by W. R. Clement in Tetrahedronletters (1962), pages 1051–1053, save that $PdCl_2$ and sodium acetate are used as catalysts therein, needs a period of 24 hours until complete and it, therefore, can scarcely be said to be useful for technical purposes. The summary course of this reaction can be illustrated by the following equation.

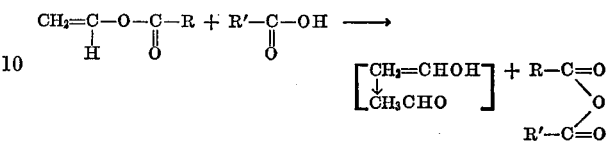

in which R and R' each stand for an alkyl radical.

The above prior art processes, which are carried out in liquid phase, have the further disadvantage that they do not permit use to be made of construction materials commonly employed in chemistry, such as Cr-Ni-steels, for reasons of corrosion.

To obviate the disadvantages encountered in prior art methods, the present invention now provides a process, wherein a carboxylic acid alkenyl ester is reacted with an aliphatic carboxylic acid in gas phase in contact with novel catalysts.

The process of the present invention for the joint manufacture of aliphatic aldehydes and carboxylic anhydrides by subjecting aliphatic carboxylic acid alkenyl esters to acylolysis at elevated temperature and, if desired, under pressure in contact with a catalyst and by subjecting the resulting reaction mixture to distillation so as to separate resulting aldehyde and resulting carboxylic anhydride therefrom, comprises more particularly using a vapor mixture of an aliphatic carboxylic acid alkenyl ester with at most 7 carbon atoms, an aliphatic carboxylic acid with at most 4 carbon atoms and, if desired, an inert gas and flowing the said mixture, at temperatures substantially between 250 and 500° C. and under pressure, if desired, over an acid catalyst, the catalyst consisting of silicic acid or an acid aluminosilicate or an inert carrier including, for example aluminum oxide, pumice or active carbon impregnated with phosphoric acid or one or more heteropolyacids, and subjecting the resulting reaction mixture to distillation so as to isolate the resulting aliphatic aldehyde and the resulting carboxylic anhydride therefrom.

A preferred embodiment of the process of the present invention comprises using as the carboxylic acid alkenyl ester vinyl acetate, allyl acetate, vinyl propionate, allyl propionates or allyl butyrates or allyl isobutyrates. The useful carboxylic acids include as preferred representatives acetic acid, propionic acid or butyric acid or isobutyric acid. While the carboxylic acid alkenyl ester should generally be reacted with stoichometric proportions of carboxylic acid, it is readily possible to use the carboxylic acid in excess. For ease in carrying out the process of the present invention, the mixture of vaporous starting materials may be used in admixture with an inert gas, such as nitrogen, $CO_2$ or $CH_4$, whereby the boiling points of the starting materials are reduced. This, however, does principally not impair the course of the reaction.

Commercially satisfactory conversion rates are obtained by flowing the starting mixture once over the catalyst, particularly at reaction temperatures between 330 and 450° C. While the reaction should generally be effected at atmospheric pressure, it may be preferable to operate under overpressure up to substantially 10 atmospheres (gauge), as this enables use to be made of smaller-dimensioned apparatuses.

A further preferred embodiment of the present process comprises impregnating the catalysts with a heteropolyacid, such as phosphomolybdic acid, silicophosphoric acid, phosphoboric acid and similar acids. The catalytic activity of silicic acid or aluminosilicates, which are useful catalysts, can be further increased by additional treatment with phosphoric acid or a heteropolyacid. The process of the present invention does not call for the presence of noble metal salts in the catalyst, such as palladium chloride, which is a feature characteristic of prior art methods. In no case, however, could these noble metal salts be found to affect the catalyst's activity, whereas alkali metal salts, which are also a constituent of the prior art catalysts, have been found to reduce the conversion rate. If use is made of palladium chloride in the catalysts of the present invention, it should be used in a maximum proportion of substantially 5 weight percent, based on the carrier. The phosphoric acid or heteropolyacid should preferably be used in proportions substantially between 1 and 50 weight percent, based on the carrier.

The process of the present invention is a very desirable step forward in the art as it enables aliphatic carboxylic anhydrides to be produced jointly with aliphatic aldehydes without any formation—as it is the case in conventional processes—of water in the reaction mixture and, accordingly, without any need to separate water therefrom.

The reaction mixture obtained in the process of the present invention should preferably be worked up by introducing the gas mixture issuing from the reactor into the center portion of a separating column, in which the lower-boiling aldehyde is condensed and removed overhead, whilst the carboxylic anhydride is obtained in the column's base portion.

The following examples further illustrate the process of this invention.

EXAMPLE 1

300 grams/hr. of a mixture of 59 weight percent of vinyl acetate and 41 weight percent of acetic acid together with 50 l./hr. of nitrogen were passed through a U-shaped tube of stainless steel, which had a diameter of 32 mm., was filled with 250 ml. of ball-shaped $SiO_2$ (diameter: 5 mm.; BET-surface area: 130 sq. m./g.) and was heated to 350° C. by means of a salt bath. The resulting gaseous reaction mixture issuing from the U-shaped tube was introduced into the center portion of a distilling column. Following the passage of 1800 grams of the vinyl acetate/acetic acid-mixture through the U-shaped tube, the reaction mixture in the distilling column was distilled and 510 grams of a base product containing 41.5 weight percent or 212 grams of acetic anhydride were removed from the column base. The balance of the said base product was acetic acid. 1290 grams of a product, which contained unreacted acetic acid and vinyl acetate together with 92 grams of acetaldehyde, were removed near the head of the distilling column. A further 20 grams of an acetone by-product were obtained in this reaction. The conversion rate was 16.9 weight percent, based on the quantity of vinyl acetate used.

EXAMPLE 2

The procedure was the same as that described in Example 1 save that a temperature of 390° C. was used. 280 grams of acetic anhydride were obtained. This corresponded to a conversion rate of 22.3 weight percent, based on the vinyl acetate/acetic acid-mixture used. 120 grams of acetaldehyde were removed near the head of the column. Apart from a minor proportion (25 grams) of acetone, the reaction products could not be found to contain by products, by gas-chromatography.

EXAMPLE 3

The procedure was the same as described in Example 1 save that ball-shaped $SiO_2$ impregnated with phosphoric acid of 10% strength were used. 500 grams/hr. of the mixture of 59 weight percent of vinyl acetate and 41 weight percent of acetic acid together with 50 l./h. (S.T.P.) of $N_2$ were passed over the catalyst at 350° C. and 72 grams/hr. of acetic anhydride and 31 grams/hr. of acetaldehyde were obtained. The conversion rate was 20.6 weight percent, based on the quantity of vinyl acetate/acetic acid-mixture used.

EXAMPLE 4

The procedure was the same as that described in Example 3 save that a reaction temperature of 390° C. was used. 1000 grams/hr. of the vinyl acetate/acetic acid-mixture together with 50 l./hr. (S.T.P.) of $N_2$ were passed over the catalyst and 160 grams/hr. of acetic anhydride and substantially 67 grams/hr. of acetaldehyde were obtained. The conversion rate was 22.8 weight percent, based on the quantity of starting material used.

EXAMPLE 5

The procedure was the same as that described in Example 3 save that acid aluminosilicate was used as the catalyst. 500 grams/hr. of the vinyl acetate/acetic acid-mixture together with 50 l./hr. (S.T.P.) of $N_2$ were passed over the acid catalyst at a temperature of 350° C. and 52 grams/hr. of acetic anhydride and 22 grams/hr. of acetaldehyde were obtained. The conversion rate was 14.9 weight percent, based on the quantity of vinyl acetate/acetic acid-mixture used.

EXAMPLE 6 (COMPARATIVE EXAMPLE)

The procedure was the same as that described in Example 1 save that the ball-shaped $SiO_2$ was used in admixture with 4 weight percent of potassium acetate. The temperature was 340° C. Acetic anhydride could not be found to have been formed. Acetaldehyde was obtained together with considerable proportions of acetone and further unidentified compounds.

EXAMPLE 7

300 grams/hr. of 62.5 weight percent of allyl acetate and 37.5 weight percent of acetic acid together with 50 l./hr. (S.T.P.) of $N_2$ were passed over the catalyst described in Example 1. The temperature was 360° C. Following 6 hours of operation and the passage of altogether 1800 grams of starting material through the reactor, 450 grams of a product containing 26.9 weight percent or 121 grams of acetic anhydride were obtained in the base portion of the distilling column. 1330 grams of a product, which contained unreacted allyl acetate and acetic acid together with substantially 5.3 weight percent or 70.6 grams of propionaldehyde, were obtained as first runnings, near the column head.

EXAMPLE 8

The procedure was the same as that described in Example 7 save that the reaction temperature was 410° C. 182 grams of acetic anhydride and 103 grams of propionaldehyde were obtained. The conversion rate substantially corresponded to 15.8 weight percent, based on the allyl acetate/acetic acid-mixture used.

EXAMPLE 9

A silicic acid carrier impregnated with 0.5 weight percent of phosphomolybdic acid was used as the catalyst. 400 grams/hr. of a mixture of 42.4 weight percent of propionic acid and 57.5 weight percent of vinyl propionate together with 50 l./hr. (S.T.P.) of $N_2$ were passed over 250 ml. of the catalyst, at a temperature of 390° C. Following the passage of altogether 2000 grams of the vinyl propionate/propionic acid-mixture through the catalyst and following distillation of the reaction mixture, 660 grams of a product, which contained 32 weight percent or 211 grams of propionic anhydride, were removed from the base portion of the distilling column. The lower-boiling first runnings, which escaped overhead, contained 71 grams of acetaldehyde. The conversion rate was 14.1 weight percent, based on the mixture of starting materials used.

What claimed is:

1. A process for the joint manufacture of aliphatic aldehydes and carboxylic anhydrides by subjecting aliphatic carboxylic acid alkenyl esters to acylolysis at elevated temperature and in contact with a catalyst and by subjecting the resulting reaction mixture to distillation so as to separate resulting aldehyde and resulting carboxylic anhydride therefrom, which comprises using a vapor mixture of an aliphatic carboxylic acid alkenyl ester with at most 7 carbon atoms and an aliphatic carboxylic acid with at most 4 carbon atoms and flowing the said mixture, at temperatures substantially between 250 and 500° C. over an acid catalyst, consisting essentially of acid aluminosilicates, or a silicic acid carrier impregnated with 1–50 weight percent of phosphomolybdic acid and subjecting the resulting reaction mixture of distillation so as to isolate resulting aliphatic aldehyde and resulting carboxylic anhydride therefrom.

2. The process as claimed in claim 1, wherein the carboxylic acid alkenyl ester is vinyl acetate, allyl acetate, vinyl propionate, an allyl propionate or allyl butyrate or allyl isobutyrate.

3. The process as claimed in claim 1, wherein the aliphatic carboxylic acid is acetic acid, propionic acid or butyric acid or isobutyric acid.

4. The process as claimed in claim 1, wherein the carboxylic acid alkenyl ester and the carboxylic acid are used in stoichiometric proportions, or the carboxylic acid is used in excess.

5. The process as claimed in claim 1, wherein the vaporous mixture of starting materials is used in admixture with an inert gas.

6. The process as claimed in claim 5, wherein the inert gas is nitrogen, carbon dioxide or methane.

7. The process as claimed in claim 1, wherein the reaction is carried out at a temperature between 330 and 450° C.

8. The process as claimed in claim 1, wherein the reaction is carried out at elevated pressure.

9. The process as claimed in claim 8, wherein the reaction is carried out under a pressure up to substantially 10 atmospheres (gauge).

10. The process as claimed in claim 1, wherein the catalyst contains palladium chloride in a maximum proportion of substantially 5 weight percent, based on the carrier.

References Cited
UNITED STATES PATENTS

| | | | |
|---|---|---|---|
| 1,856,251 | 5/1932 | Herrmann et al. | 260—549 |
| 2,116,657 | 5/1938 | Dreyfus | 260—549 |
| 3,590,081 | 6/1971 | Ishida et al. | 260—549 |

LORRAINE A. WEINBEGER, Primary Examiner

R. D. Kelly, Assistant Examiner